(12) United States Patent
Chai et al.

(10) Patent No.: US 10,438,567 B2
(45) Date of Patent: Oct. 8, 2019

(54) PRESENTING DISPLAY DATA ON A TEXT DISPLAY

(71) Applicants: HEWLETT-PACKARD DEVELOPMENT COMPANY, L.P., Houston, TX (US); Xiaorong Chai, Shanghai (CN); Jun-Hui Wang, Shanghai (CN); Xin-Wei Wang, Shanghai (CN)

(72) Inventors: Xiaorong Chai, Shanghai (CN); Jun-Hui Wang, Shanghai (CN); Xin-Wei Wang, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/570,943

(22) PCT Filed: Jul. 23, 2015

(86) PCT No.: PCT/CN2015/084906
§ 371 (c)(1),
(2) Date: Oct. 31, 2017

(87) PCT Pub. No.: WO2017/012111
PCT Pub. Date: Jan. 26, 2017

(65) Prior Publication Data
US 2018/0286354 A1  Oct. 4, 2018

(51) Int. Cl.
*G09G 5/32* (2006.01)
*G09G 5/22* (2006.01)
*G06F 16/957* (2019.01)

(52) U.S. Cl.
CPC ......... *G09G 5/227* (2013.01); *G06F 16/9577* (2019.01); *G09G 5/32* (2013.01)

(58) Field of Classification Search
None
See application file for complete search history.

(56) References Cited

U.S. PATENT DOCUMENTS 6,473,102 B1 * 10/2002 Rodden ............... G06F 3/0481
                                                                   715/781
7,287,220 B2    10/2007 Kaasila et al.
(Continued)

OTHER PUBLICATIONS

Mavlankar, et al. Stanford University. Optimal Slice Size for Streaming Regions of High Resolution Video with Virtual Pan/Tilt/Zoom Functionality. 15th European Signal Processing Conference. Poznan, Poland, Sep. 3-7, 2007. Copyright EURASIP.

*Primary Examiner* — Andrew G Yang
(74) *Attorney, Agent, or Firm* — HP Inc. Patent Department

(57) ABSTRACT

According to various examples, a first resolution of original display data and a second resolution of a text display may be obtained. In response to a determination that the second resolution is smaller than the first resolution, the original display data may be searched for a relocation area and a bland area. The relocation area may include valid pixels not capable of being displayed on the text display. The blank area may not include valid pixels and may be capable of being displayed on the text display. The blank area may be used to accommodate the relocation area within the text display to generate reconstructed display data, and the reconstructed display data may be outputted to the text display.

13 Claims, 12 Drawing Sheets

(56) References Cited

U.S. PATENT DOCUMENTS

| | | | |
|---|---|---|---|
| 7,385,615 B2 | 6/2008 | Vale et al. | |
| 7,900,137 B2 | 3/2011 | Ivarsoy et al. | |
| 2003/0014445 A1* | 1/2003 | Formanek | G06F 17/211 715/247 |
| 2003/0174169 A1 | 9/2003 | Tiwari et al. | |
| 2007/0294618 A1* | 12/2007 | Yamamoto | G06F 3/0489 715/210 |
| 2008/0072139 A1 | 3/2008 | Salinas et al. | |
| 2008/0209358 A1* | 8/2008 | Yamashita | G09G 3/20 715/781 |
| 2009/0222722 A1* | 9/2009 | Vaschillo | G06F 17/212 715/245 |
| 2010/0271288 A1 | 10/2010 | Srinivasan et al. | |
| 2012/0096344 A1* | 4/2012 | Ho | G06F 17/211 715/249 |
| 2015/0103079 A1* | 4/2015 | Khambanonda | G06T 11/60 345/441 |
| 2015/0254804 A1* | 9/2015 | Hasegawa | G06K 9/00 345/660 |
| 2015/0331588 A1* | 11/2015 | Ishida | G06F 3/04812 715/765 |
| 2016/0062728 A1* | 3/2016 | Furuoka | G06F 3/1462 345/173 |

\* cited by examiner

40 the processor searches in the original display data for an extruding area, and obtains a size of the extruding area — 41 the processor searches in the original display data for the blank area having a size equal to the size of the extruding area — 42

FIG.4

50 the processor determines an area from row N+1 to row A of the original display data to be the extruding area if there is a valid pixel in row A and there is no valid pixels from row A+1 to row M — 51 the processor may search between row 1 and row N for a blank area having X rows, X equals to a difference of A and N — 52

FIG.5

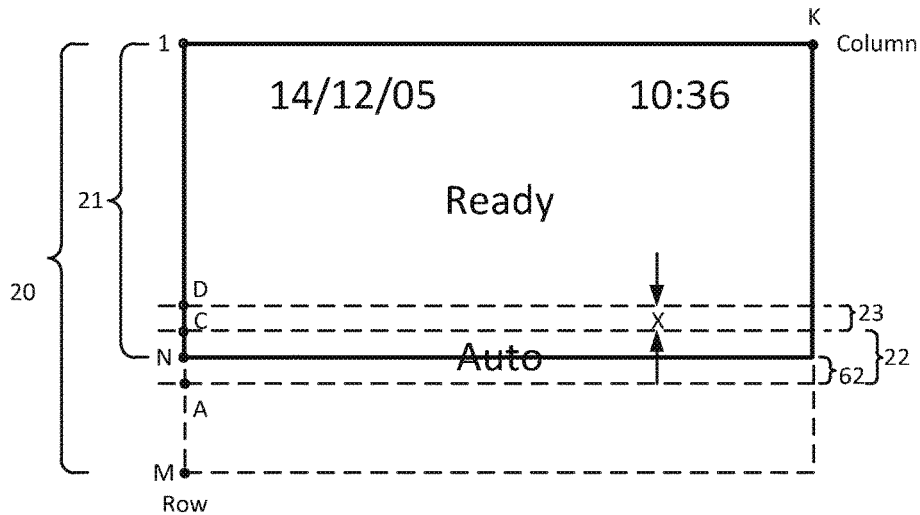
FIG.6A
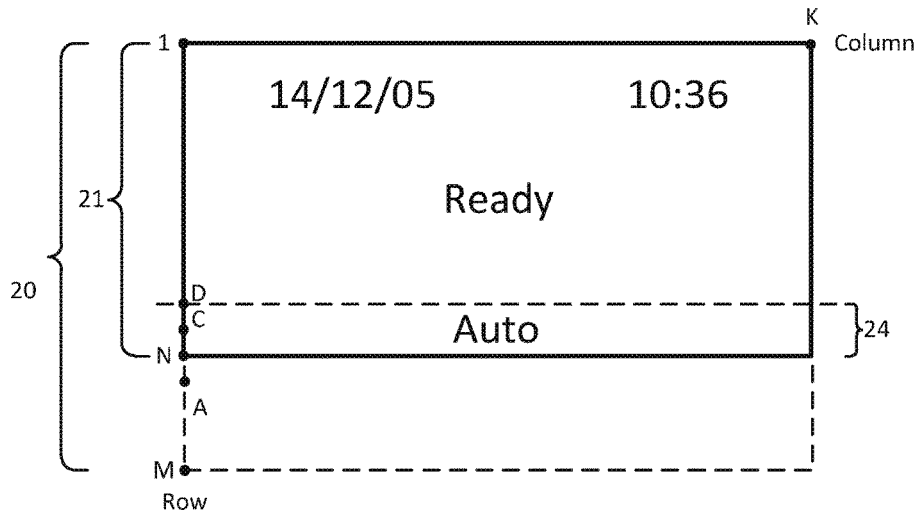
FIG.6B
70
71 — the processor may determine an area from column L+1 to column B of the original display data to be the extruding area if there is a valid pixel in column B and there is no valid pixels from column B+1 to column K
72 — the processor may search between column 1 and column L for the blank area having Y columns. Y equals to a difference of B and L
FIG. 7

PRESENTING DISPLAY DATA ON A TEXT DISPLAY

BACKGROUND

A text display is an electronic display device that is capable of presenting display data, such as text or even simple graphic characters, to users or customers. Text displays may be used in a machine such as a printer, a clock (e.g., a clock radio, a wristwatch), a refrigerator, an electronic thermometer, and variable-message signs (e.g., departure boards, intelligent transportation systems).

BRIEF DESCRIPTION OF THE DRAWINGS

Features of the present disclosure are illustrated by way of example and not limited in the following figure(s), in which like numerals indicate like elements, in which:

FIG. 4 is a flowchart illustrating a method of adapting display data to a text display having a resolution not matching that of the display data in accordance with an example of the present disclosure;

FIG. 5 is a flowchart illustrating a method of processing display data when the display data includes more rows than a text display in accordance with an example of the present disclosure:

FIGS. 6A and 6B are schematic diagrams illustrating the effect of presenting original display data and reconstructed display data respectively on a text display having a resolution not matching that of the original display data in accordance with an example of the present disclosure;

FIG. 7 is a flowchart illustrating a method of processing display data when the display data includes more columns than a text display in accordance with an example of the present disclosure;

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The "first", "second" used herein are merely for distinguishing two similar objects, and have no substantial meanings.

When a text display is employed to display information to users, there is a possibility that the resolution of original display data stored in a storage device and the resolution of the text display may not match. In some circumstances, partial content of the original display data may be missed due to the mismatch of the two resolutions. In an example, a method may be provided for presenting display data on the text display to avoid omission of the content of the original display data. The text display may include electromechanical split-flap displays, vane displays, flip-disc displays, all-electronic liquid-crystal displays, incandescent egg crate displays, LED displays, vacuum fluorescent displays, and electric nixie tubes.

Figure 1:
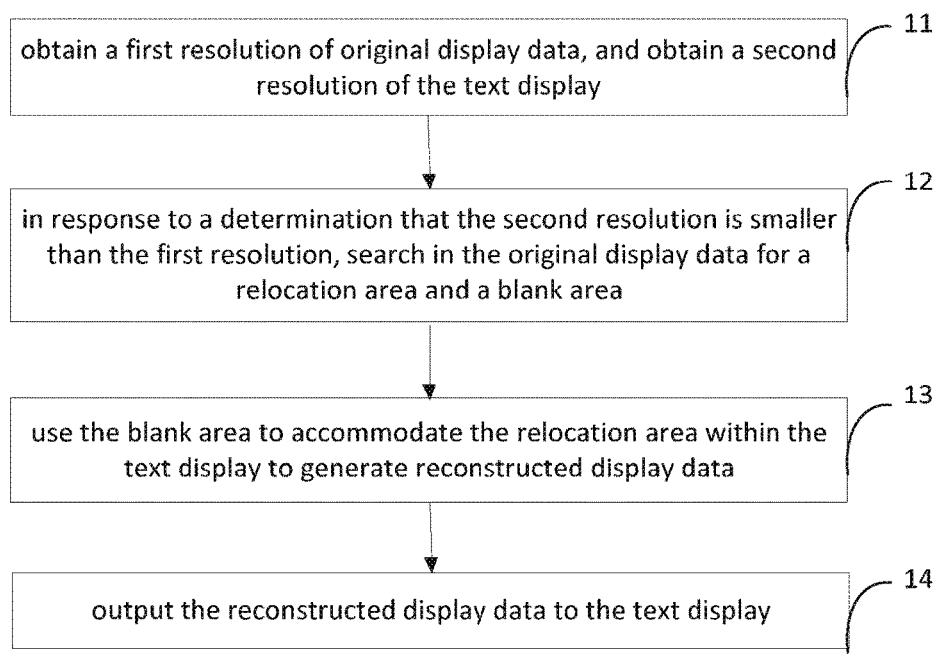
FIG. 1 is a flowchart illustrating a method of presenting display data on a text display in accordance with an example of the present disclosure.

FIG. 1 is a flowchart illustrating a method 10 of presenting display data on a text display in accordance with an example of the present disclosure. The method 10 may include the following procedures.

At block 11, a first resolution of original display data may be obtained, and a second resolution of the text display may be obtained.

In examples of the present disclosure, "original display data" may refer to information related to a machine equipped with the text display. Such information may include texts or graphical signs representing a working state of the machine, or a measurement result generated by the machine, or the like. For example, the information may be printing information of a printer, date and time presented by a clock, temperatures of a storage cabinet of a refrigerator, etc.

In an example, the original display data may conform to a pre-defined mechanism of arranging and storing values of pixels, and may be capable of being interpreted by a processor within the machine to obtain the values of the pixels, so as to generate proper digital or analogue signals capable of making the text display to present the information.

In an example, the original display data may be configured in the machine when the machine is manufactured, and cannot be changed. In another example, the original display data may be generated using information inputted by a user. The original display data may be stored in a storage device accessible by the machine. Such storage device may include a read-only memory (ROM), a random-access memory (RAM), a flash memory of a processor within the machine, a portable storage device, an external storage device accessible by the machine via a wired or wireless network, or the like.

The first resolution of the original display data may refer to the resolution of a display on which the original display data is designed to be displayed. In an example, the original display data may describe values of pixels, and the pixels are in a one-to-one mapping relation with pixels defined by the first resolution. The first resolution may be pre-configured in a component of the machine when the component is manufactured. Such component may include a storage device, a processor, a microcontroller, etc. In an example, the first resolution may be stored in a read-only memory (ROM), a random-access memory (RAM), a flash memory, or the like, of a processor within the machine.

The second resolution of the text display may be obtained from the text display. In an example, a processor in the machine may obtain hardware information of the text display, and obtain the second resolution from the hardware information. In another example, the second resolution may be obtained from information inputted by a user.

At block 12, in response to a determination that the second resolution is smaller than the first resolution, the original display data may be searched for a relocation area and a blank area.

In an example, the relocation area may refer to an area in which valid pixels form a set of characters or a sign that as a whole is human-recognizable as a meaningful message, such as a word, a sentence, a date, a time, a sign, or the like, and one or plural of the valid pixels are not capable of being displayed on the text display. In an example, the relocation area may include valid pixels not capable of being displayed on the text display. A valid pixel may be not capable of being displayed on the text display due to the difference in definition between the original display data and the text display, i.e., the valid pixel is beyond the boundaries of the text display.

The blank area may refer to an area in the original display data that is within boundaries of the text display and includes no valid pixels, i.e., being blank.

According to examples of the present disclosure, the valid pixels may refer to pixels that form part of a human-recognizable character or pattern on the text display. The definition of the valid pixel may be decided by the type of display screen of the text display and the method of describing colors. In an example, in a black and white LCD screen, a pixel displayed in the black color may be a valid pixel. In an example, a pixel having a non-zero value (referred to as non-zero pixel) may be a valid pixel.

According to various examples, the relocation area may be found using various methods such as the methods described with reference to FIGS. 2A and 3A.

In an example, a processor may scan the original display data for continuous lines including valid pixels some of which are the valid pixels are not capable of being displayed on the text display, and determine the continuous lines to be the relocation area. The "lines" herein described may refer to rows or columns depending on the relationship between the first resolution and the second resolution. In an example, when the number of rows of the first resolution is larger than that of the second resolution, i.e., there are rows of pixels not capable of being displayed on the text display, continuous rows including valid pixels may be searched for from row M to row 1, and M is the number of rows of the first resolution. When the number of columns of the first resolution is larger than that of the second resolution, i.e., there are columns of pixels not capable of being displayed on the text display, continuous columns including valid pixels may be searched for from column K to column 1, and K is the number of columns of the first resolution. When there are both rows and columns not capable of being displayed on the text display, the method may be carried out for rows and columns, respectively. In an example, when there are plural lines including no valid pixels between two lines including valid pixels in the original display data, and F represents the number of the plural lines including no valid pixels, the two lines may be determined to be continuous if F is smaller than a pre-defined threshold. The pre-defined threshold may be determined according to the size of an interval between two characters or two words such that valid pixels forming a whole word or a whole sentence may be identified as the relocation area.

Figure 2A:
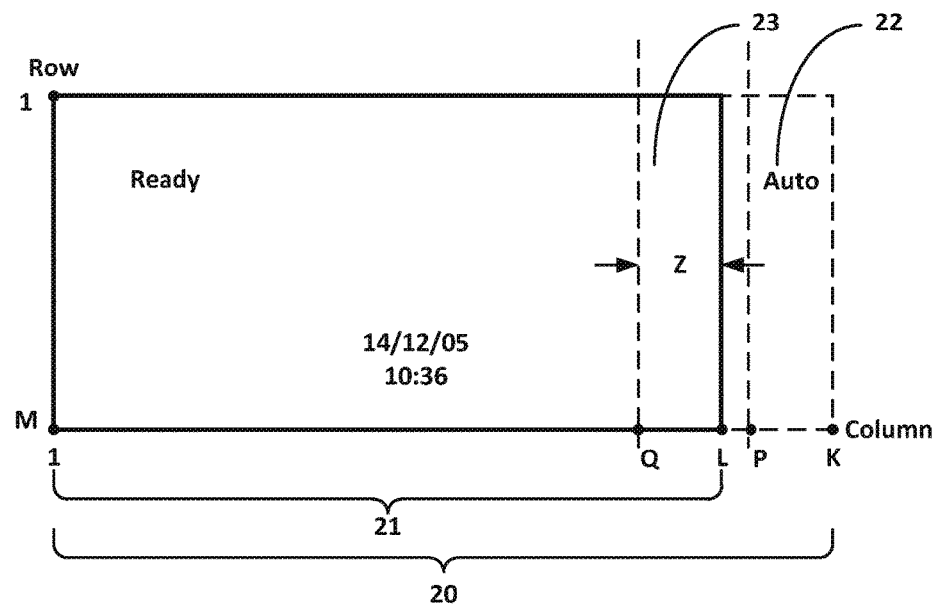
FIG. 2A is a schematic diagram illustrating the effect of presenting original display data on a text display having a resolution not matching that of the original display data in accordance with an example of the present disclosure.

For example, as shown in FIG. 2A, the original display data may describe an original display area 20 having the first resolution. The original display area 20 may include M rows and K columns. The text display may have a text display area 21 having the second resolution which may include M rows and L columns. The word "Auto" is out of the text display area 21, thus cannot be displayed on the text display. A processor of a machine may compare the first resolution with the second resolution, and determine there are columns not capable of being displayed on the text display, e.g., columns L to K. The processor may scan starting from column K towards column 1 for continuous columns including valid pixels. After detecting a pre-defined number of columns including no valid pixels at column P, the processor may determine the area between columns P+1 to K to be the relocation area 22. The pre-defined number may be determined according to the size of an interval between two characters or two words, e.g., may be set to be a value larger than the size of the interval.

In an example, a processor may scan the original display data for a pre-defined number of continuous lines including no valid pixels, and determine an area on one side of the continuous lines to be the relocation area. In an example, the pre-defined number may be determined to be larger than the size of an interval between two characters or two words. The side may be determined according to the relationship between the first resolution and the second resolution, e.g., the side there is valid pixels not capable of being displayed on the text display. In an example, when the number of rows of the first resolution is larger than that of the second resolution and row N+1 to row M cannot be displayed on the text display, continuous rows including no valid pixels may be searched for from row M to row 1, and M is the number of rows of the first resolution. After finding the continuous lines including no valid pixels, the area on the same side of the continuous lines with the row M may be determined to be the relocation area. When the number of columns of the first resolution is larger than that of the second resolution and columns L+1 to column K cannot be displayed on the text display, continuous columns including no valid pixels may be searched for from column K to column 1, and K is the number of columns of the first resolution. After finding the continuous lines including no valid pixels, the area on the same side of the continuous lines with the column K may be determined to be the relocation area. When there are both rows and columns not capable of being displayed on the text display, the method may be carried out for rows and columns, respectively. In an example, the continuous lines including no valid pixels may be searched in the original display data starting from a line including valid pixels. As such, a blank border area in the original display data may not be determined to be the continuous lines searched for.

Figure 3A:
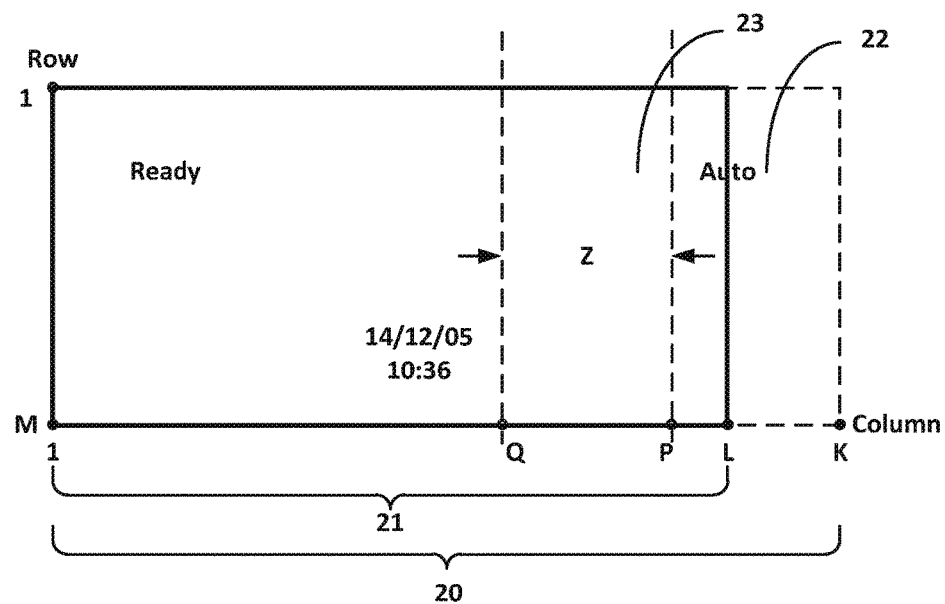
FIGS. 3A and 3B are schematic diagrams illustrating the effect of presenting original display data and reconstructed display data respectively on a text display having a resolution not matching that of the original display data in accordance with an example of the present disclosure.
Figure 3B:
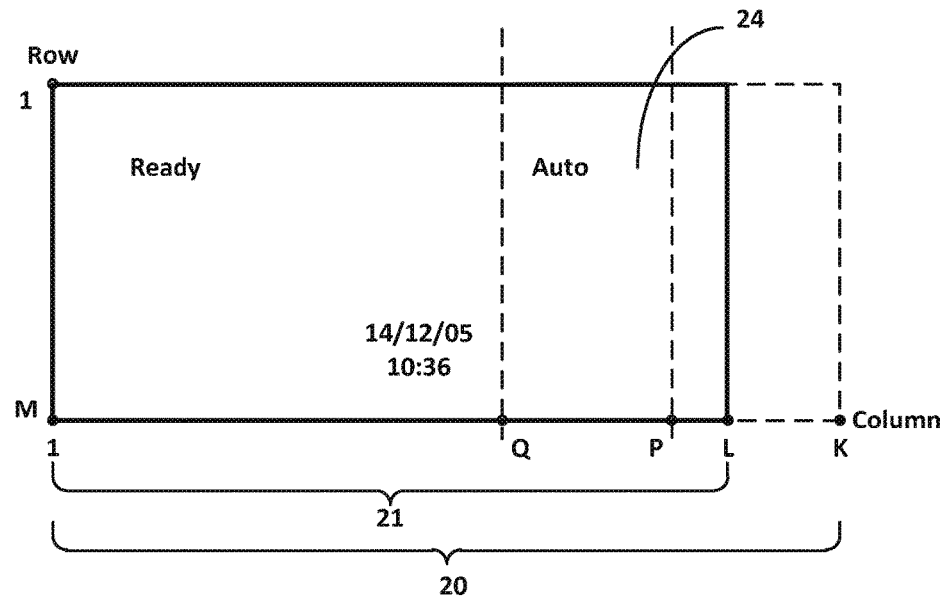

For example, as shown in FIG. 3A, the word "Auto" is partially out of the text display area 22, thus cannot be displayed in complete on the text display. The processor may compare the first resolution with the second resolution, and determine there are columns not capable of being displayed on the text display, e.g., columns L to K. The processor may scan starting from column K towards column 1 for continuous columns including no valid pixels. The first few lines starting from column K does not include a valid pixel, and may be regarded as a blank border, not the continuous lines searched for. After detecting a pre-defined number of columns including no valid pixels at column P, the processor may determine the area one the same side of with column K, i.e., the area between columns P+1 to K to be the relocation area 22.

According to various examples, the blank area may be found using various methods. In an example, the processor may scan an area in the original display data that is capable of being displayed on the text display for continuous lines including no valid pixels, and determine the continuous lines to be the blank area. In an example, when the number of rows of the first resolution is larger than that of the second resolution, continuous rows including no valid pixels may be searched for between row N and row 1, and N is the number of rows of the second resolution. When the number of columns of the first resolution is larger than that of the second resolution, continuous columns including no valid pixels may be searched for between column L and column 1, and L is the number of columns of the second resolution. When there are both rows and columns not capable of being displayed on the text display, the method may be carried out for rows and columns, respectively.

In an example, the continuous lines including no valid pixels and having the same number of lines with the relocation area may be determined to be the blank area.

In the example as shown in FIG. 2A, after determining the relocation area is from column P+1 to column K, and P is larger than L, the processor may scan from column L to column 1 for continuous columns including no valid pixels, and determine columns L to Q+1 to be the blank area 23. The different between L and Q is Z which equals the difference between K and P. In the example as shown in FIG. 3A, after determining the relocation area is from column P+1 to column K, and P is smaller than L, the processor may scan from column P to column 1 for continuous columns including no valid pixels, and determine columns P to Q+1 to be the blank area 23. The different between P and Q is Z which equals the difference between K and P.

At block 13, the blank area is used to accommodate the relocation area within the text display to generate reconstructed display data.

For example, the reconstructed display data may refer to modified original display data in which the relocation area is accommodated within the text display using the blank area. According to various examples, different manners may be used to accommodate the relocation area using the blank area. In an example, the blank area may be replaced with the relocation area. In an example, the relocation area may be moved in the direction of the blank area to overlay the blank area. In an example, the relocation area may be relocated at the position of the blank area.

In the examples as shown in FIGS. 2A, 2B and 3A, 3B, after the relocation area 22 is accommodated using the blank area 23, the relocation area 22 is moved within the text display area 21. The word "Auto" which was in the relocation area 22 is moved to the position of the blank area 21, can be displayed in complete in area 24 on the text display.

At block 14, the reconstructed display data is outputted to the text display for display.

According to various examples, the procedure of searching in the original display data for an area (e.g., the relocation area, the blank area) may involve searching in the original display data for pixels forming the area according to pixel values in the original display data. Detailed searching method may be decided by the arrangement and storage mechanism of the pixel values in the original display data and the format of the original display data. In order to avoid unnecessarily obscuring the technical mechanism with too many details, such procedures are simply referred to herein as searching for an area in the original display data. Similarly, procedures related to handling an area in the original display data (e.g., using the blank area to accommodate the relocation area, moving the relocation area within the text display) may involve modifying pixel values in the original display data or generating reconstructed display data describing pixel values after the area is handled. Detailed implementation method of such procedures may also be closely related to the arrangement and storage mechanism of the pixel values and the format of the original display data, and the procedures are simply referred to as handling an area in the original display data.

In various examples, outputting the reconstructed area to the text display for display may involve generating digital or analogue signals using the reconstructed area, and outputting the digital or analogue signals to the text display for display. The generating method may be decided by the type of text display, and is not described further herein.

According to various examples, the method converts the original display data into reconstructed display data to adapt the original display data to the resolution of the text display, thus avoids omission of the content of the original display data due to the mismatch.

According to an example, the size of the blank area may be determined according to the size of the relocation area. According to another example, the size of the blank area may be determined according to the size of an extruding area. The extruding area may refer to an area of the original display data not capable of being displayed on the text display.

FIG. 4 is a flowchart illustrating a method 40 of adapting display data to a text display having a resolution not matching that of the display data in accordance with an example of the present disclosure. Similar procedures that have been described above may be omitted in FIG. 4 and subsequent examples for being concise. The method 40 may include the following procedures.

At block 41, a processor may determine an extruding area of the original display data not capable of being displayed on the text display, and obtain the size of the extruding area.

At block 42, the processor may search in the original display data for a blank area having a size equal to the size of the extruding area.

In an example, the extruding area may refer to an area of the original display data that is beyond the boundaries of the text display. According to various examples, the extruding area may be determined according to the relationship between the first resolution and the second resolution. In an example, when the number of rows of the first resolution is larger than that of the second resolution, row M to row N+1, which are the rows of pixels not capable of being displayed on the text display, may be determined to be the extruding area, and the size of the extruding area may be the difference between M and N. M is the number of rows of the first resolution, and N is the number of rows of the second resolution. When the number of columns of the first resolution is larger than that of the second resolution, column K to column L+1, which are the columns of pixels not capable of being displayed on the text display, may be determined to be the extruding area, and the size of the extruding area may be the difference between K and L. K is the number of columns of the first resolution, and L is the number of columns of the second resolution.

In an example, the processor may determine the extruding area according to method 50 as shown in FIG. 5. Similar procedures that have been described above may be omitted for being concise. The method 50 may include the following procedures.

At block 51, the processor may determine an area from row N+1 to row A of the original display data to be the extruding area if there is a valid pixel in row A and there is no valid pixels from row A+1 to row M. M is the number of rows of the first resolution, and N is the number of rows of the second resolution, and A is larger than N.

In an example as shown in FIG. 6A, the original display area 20 may have M rows and K columns, the text display area 21 may have N rows and K columns. The lower half of the word "Auto" is out of the text display area 21, thus cannot be displayed in complete on the text display. The processor may compare the first resolution with the second resolution, and determine there are rows not capable of being displayed on the text display, e.g., rows N+1 to M. The processor may scan starting from row M to row N+1 for the first row including valid pixels. The processor may find out row A is the first of the rows scanned that includes a valid pixel, thus determine the area from row N+1 to row A to be the extruding area 62. The processor may calculate the size of the extruding area 62. In the example shown in FIG. 6A, the size of the extruding area 62 may be the difference between A and N, denoted as X.

At block 52, the processor may search between row 1 and row N for a blank area having X rows. X equals to the difference between A and N.

In an example, the processor may scan from row N towards row 1 for the blank area, and determine the area from row C to row D+1 to be the blank area 23. The difference between C and D equals X. In an example, the processor may determine the area between the blank area 23 and the extruding area 62 to be belong to the relocation area, and the extruding area 62 also belong to the relocation area. In the example shown in FIG. 6A, the processor may determine the area from row C+1 to row A to be the relocation area 22.

In an example, after determining the extruding area 62 by scanning the rows for a row including a valid pixel, the processor may continue to scan from row A towards row 1 to determine the relocation area 22. In the example as shown in FIG. 6A, the processor may find out the area from row A to row C+1 to be the relocation area 22. After detecting row C includes no valid pixel which results in the detection of the relocation area, the processor may continue to scan from row C towards row 1 for the blank area. In the example as shown in FIG. 6A, the processor may find out the area from row C to row D+1 to be the blank area 23.

As shown in FIG. 6B, after moving the relocation area 22 to the position of the blank area 23, the word "Auto" is within the text display area 21, and can be displayed in complete on the text display in area 24.

In an example, the processor may determine the extruding area according to method 70 as shown in FIG. 7. Similar procedures that have been described above may be omitted for being concise. The method 70 may include the following procedures.

At block 71, a processor may determine an area from column L+1 to column B of the original display data to be the extruding area if there is a valid pixel in column B and there is no valid pixels from column B+1 to column K. K is the number of columns of the first resolution, and L is the number of columns of the second resolution, and B is larger than L.

Figure 8A:
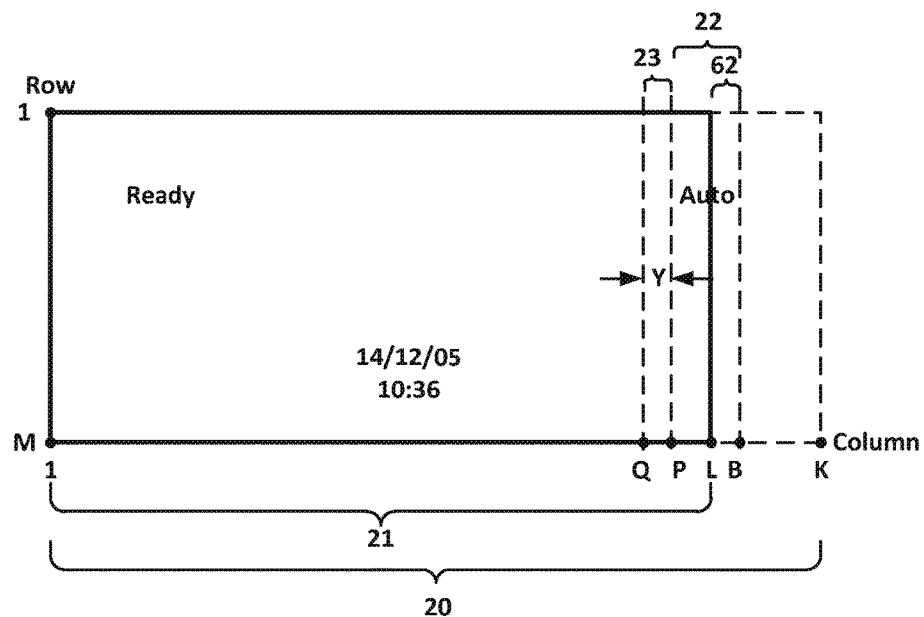
FIGS. 8A and 8B are schematic diagrams illustrating the effect of presenting original display data and reconstructed display data respectively on a text display having a resolution not matching that of the original display data in accordance with an example of the present disclosure.

In an example as shown in FIG. 8A, the right half of the word "Auto" is out of the text display area 22, thus cannot be displayed in complete on the text display. The processor may compare the first resolution with the second resolution, and determine there are columns not capable of being displayed on the text display, e.g., columns L+1 to K. The processor may scan starting from column K to column L+1 for the first column including valid pixels. The processor may find out column B is the first of the columns scanned that includes a valid pixel, thus determine the area from column L+1 to column B to be the extruding area 62. The processor may calculate the size of the extruding area 62. In the example shown in FIG. 8A, the size of the extruding area 62 may be the difference between B and L, denoted as Y.

At block 72, the processor may search between column 1 and column L for the blank area having Y columns. Y equals to a difference of B and L.

In an example, the processor may scan from column L towards column 1 for the blank area, and determine the area from column P to column Q+1 to be the blank area 23. The difference between P and Q equals Y. In an example, the processor may determine that the area between the blank area 23 and the extruding area 62 belongs to the relocation area and the extruding area 62 also belongs to the relocation area. In the example shown in FIG. 8A, the processor may determine the area from column B to column P+1 to be the relocation area 22.

In an example, after determining the extruding area 62 by scanning the columns for a column including a valid pixel, the processor may continue to scan from column B towards column 1 to determine the relocation area 22. In the example as shown in FIG. 8A, the processor may find out the area from column B to column P+1 to be the relocation area 22. After detecting column P includes no valid pixel which results in the detection of the relocation area, the processor may continue to scan from column P towards column 1 for the blank area. In the example as shown in FIG. 8A, the processor may find out the area from column P to column Q+1 to be the blank area 23.

Figure 8B:
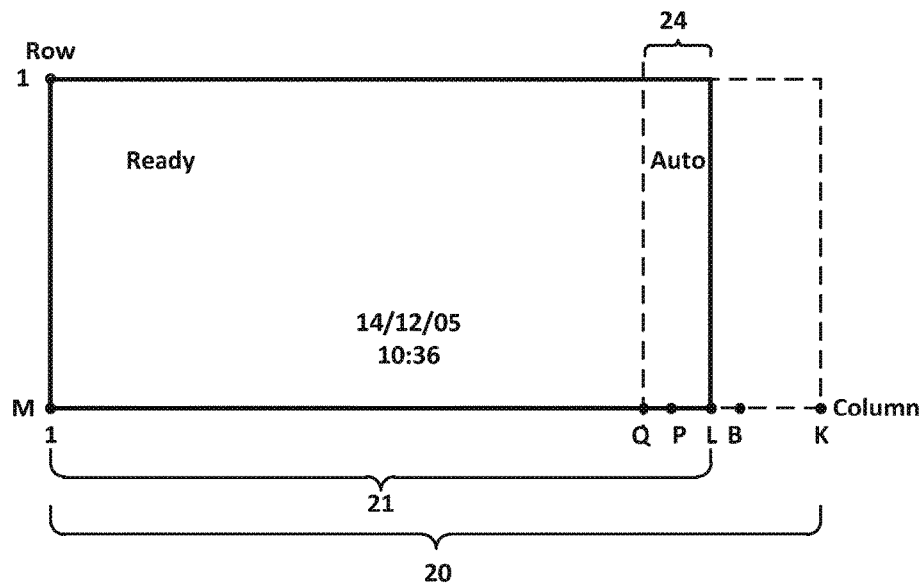

As shown in FIG. 8B, after moving the relocation area 22 to the position of the blank area 23, the word "Auto" is within the text display area 21, and can be displayed in complete on the text display in area 24.

Figure 9:
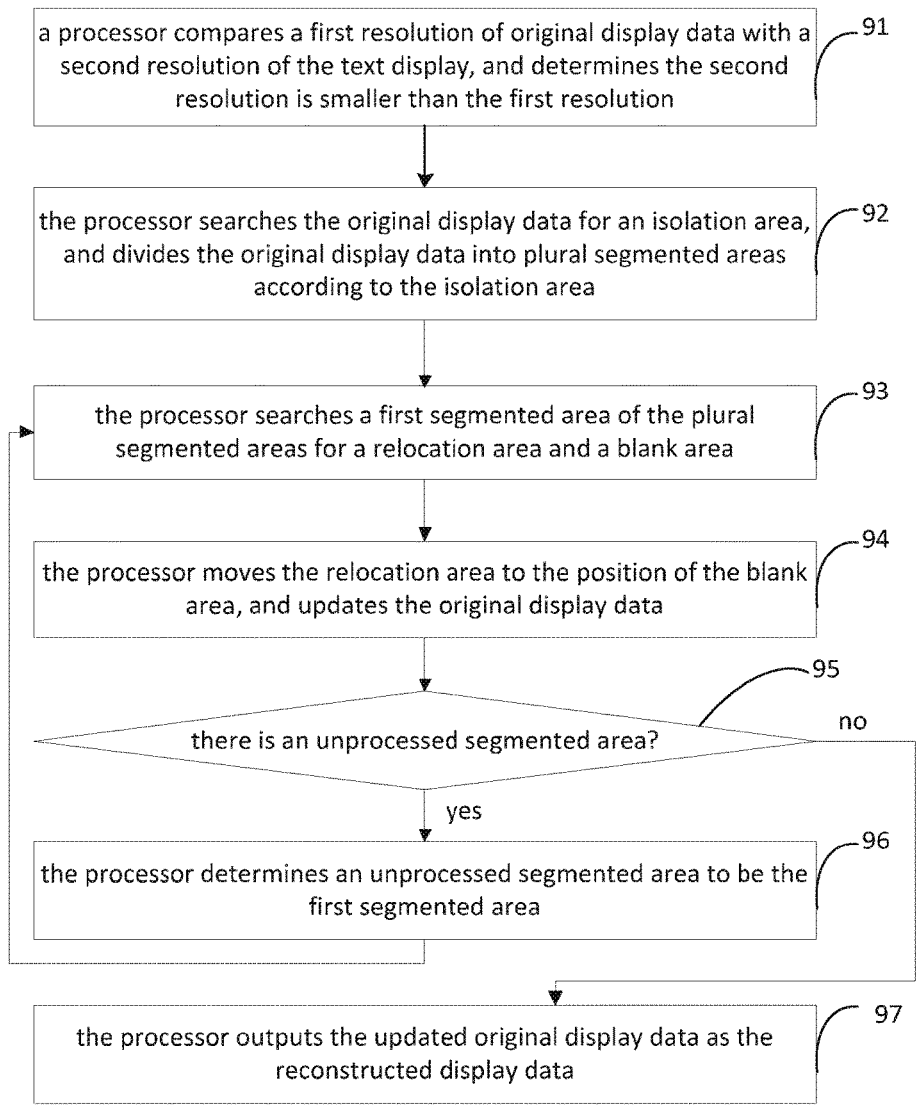
FIG. 9 is a flowchart illustrating a method of presenting display data on a text display in accordance with an example of the present disclosure.

In an example, the original display data may be divided into plural segments, and each segment may be processed according to the above methods to generate the reconstructed display data. FIG. 9 is a flowchart illustrating a method 90 of presenting display data on a text display in accordance with an example of the present disclosure. The process 90 may include the following procedures.

At block 91, a processor may compare the first resolution with the second resolution to find whether to adapt the original display data to the text display. If the processor determines the second resolution is smaller than the first resolution, the processor may perform the procedure in block 92.

At block 92, the processor may search the original display data for an isolation area, and use the isolation area to divide the original display data into plural segmented areas.

The isolation area may refer to an area which divides the original display data into plural independent parts, and each part may present a set of human-recognizable characters or a sign. In an example, when the original display data has M rows and K columns of pixels, the isolation area may include no valid pixels from column 1 to column K. In an example, the isolation area may include no valid pixels from row 1 to row M.

Figure 10A:
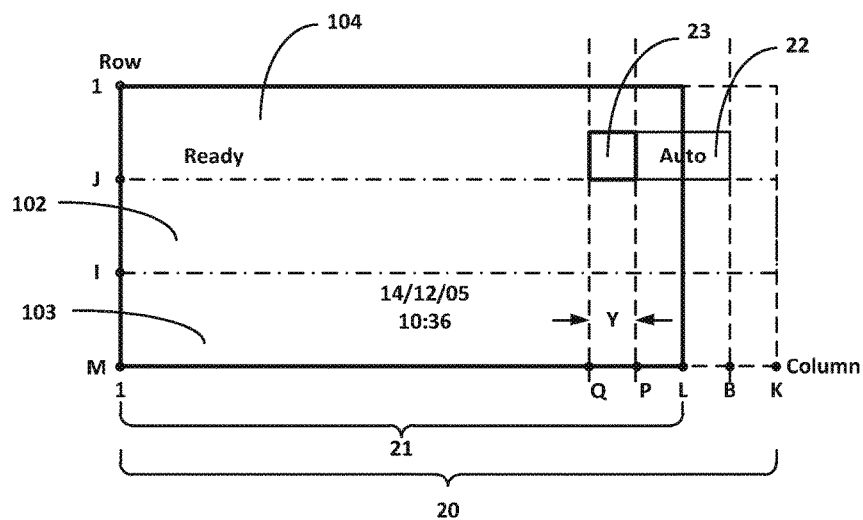
FIGS. 10A and 10B are schematic diagrams illustrating the effect of presenting original display data and reconstructed display data respectively on a text display having a resolution not matching that of the original display data in accordance with an example of the present disclosure.

In an example, referring to FIG. 10A, the isolation area 102 may be an area including no valid pixels. The isolation area 102 may partition the original display data into segmented areas 103, 104. The segmented areas 103, 104 may be processed independently thereafter, thereby obtaining more flexibility for display data processing.

It may be supposed that the original display data has M rows and K columns of pixels. In an example, when an area having no valid pixels from column 1 to column K is detected, it may be considered as the isolation area, such as the isolation area 102 shown in FIG. 10A. Specifically, as to the isolation area 102, from row a1 to row a2 of the original display data, all pixels within columns 1 to K are non-valid pixels.

In another example, the isolation area may be an area having no valid pixels from row 1 to row M. For example, the isolation area may be an area spanning E columns (e.g., from column G to column H), which has no valid pixels from row 1 to row M, and n is the difference between G and H.

The isolation area may be detected using various methods. For example, the processor may search the original display data from one side to the opposing side for lines including no valid pixels, and find consecutive lines including no valid pixels as an isolation area. The "lines" here may refer to rows or columns depending on the relationship between first resolution and the second resolution. In an example, when the number of rows of the first resolution is larger than that of the second resolution, i.e., there are rows of pixels not capable of being displayed on the text display, columns including no valid pixels may be searched for from column 1 to column K, and K is the number of columns of the first resolution. When there are columns of pixels not capable of being displayed on the text display, rows including no valid pixels may be searched for from row 1 to row M, and M is the number of rows of the first resolution. When there are both rows and columns not capable of being displayed on the text display, the above method may be carried out for rows and columns, respectively.

In an example, referring to FIG. 10A, the processor may compare the first resolution with the second resolution and determine the first resolution has more columns than the second resolution, thus search from row 1 to row M for an isolation area. The processor may search for continuous rows including no valid pixels within rows I to M, and find rows I to J includes no valid pixels. The processor may determine the area from row I to row J within columns 1 to K to be the isolation area 102. The processor may determine the two areas on either side of the isolation area 102 to be segmented areas 103 and 104, respectively.

In an example, when plural isolation areas are found, the original display data may be partitioned into more than three segmented areas in a manner similar to the above. The method of various examples may be applied to each of the segmented areas to generate the reconstructed display data.

At block 93, the process may search in a first segmented area of the plural segmented areas for a relocation area and a blank area.

In an example, the method of searching for the relocation area and the blank area may be similar to the above methods, may only be different in that the relocation area and the blank area are searched in the first segmented area of the original displayed data, not in the whole original display data.

In an example, as shown in FIG. 10A, the processor may search in the segmented area 104 for a relocation area 22 and a blank area 23. The relocation area 22 may be from column B to column P+1. The processor may obtain the size of an extruding area, i.e., the difference between B and L, which is denoted as Y. Then the processor may search in the segmented area 104 for a blank area 23 which has a size equal to the size of the extruding area. The processor may determine the area from column P to column Q within the segmented area 104 to be the blank area 23. The size of the blank area, i.e., the difference between P and Q, is Y.

In an example, the procedure in block 93 may be performed in response to a determination that the first segmented area includes a valid pixel not capable of being displayed on the text display. In an example, the processor may search for a valid pixel within an area of the first segmented area which is not capable of being displayed on the text display. If a valid pixel is found in the area, the processor may make a determination that the first segmented area includes a valid pixel not capable of being displayed on the text display.

At block 94, the processor may move the relocation area to the position of the blank area, and update the original display data.

Figure 10B:
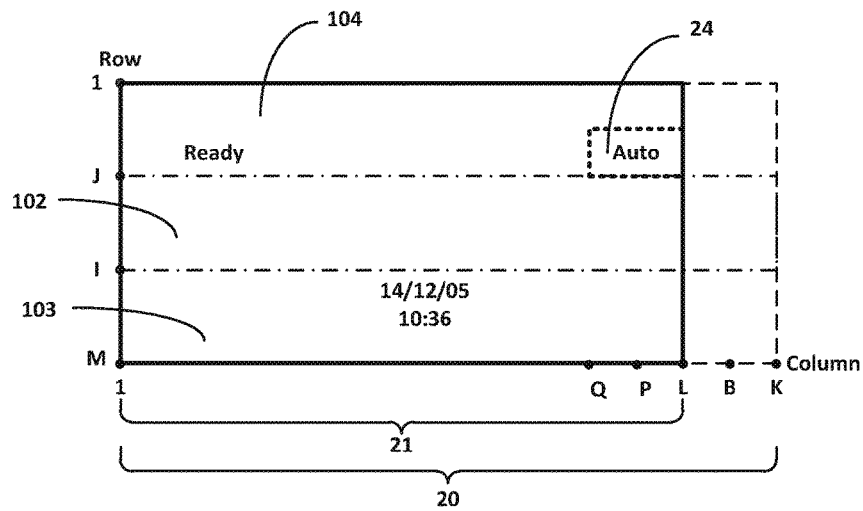

In an example, the processor may move the relocation area in the direction of the blank area to overlay the blank area. For example, as shown in FIG. 10A, the relocation area 22 may be moved towards column Q until the previous column P+1 overlaps with the column Q. As shown in FIG. 10B, after the relocation area 22 is placed at the position of the blank area 23, the word "Auto" is displayed in area 24 within the text display area 21, thus can be displayed in complete on the text display. The processor may store the adjusted original display data to replace the original display date.

At block 95, the processor may judge whether there is an unprocessed segmented area. If there is a segmented area that has not been processed according to the previous procedures, the procedure in block 96 may be performed. If all of the plural segmented areas have been processed, the procedure in block 97 may be performed.

In an example, the processor may store information of the segmented areas, and add a mark to a segmented area having been processed through the above procedures. In an example, the processor may store information of unprocessed segmented areas, and delete information of a segmented area after the segmented area is processed. Based on the stored information, the processor may determine whether there is a segmented area that has not been processed. For example, referring to FIG. 10A, the processor may store the row range and column range of segmented areas 103 and 104. After the segmented area 104 is processed, the processor may delete the information of the segmented area 104, determine the segmented area 103 is unprocessed from the remaining information of segmented area 103. As such, the processor may obtain the row range and column range of the remaining segmented area 103 as the first segmented area in block 95.

In an example, the processor may search in each segmented area for a valid pixel not capable of being displayed on the text display, and process each segmented area found. In an example, as shown in FIG. 10A, the processor may search in segmented area 104 for a valid pixel between column L+1 to column K, i.e., columns not capable of being displayed on the text display. After such a valid pixel is found, the segmented area 104 may be processed through the above procedures. The processor may search in segmented area 103 for a valid pixel between column L+1 to column K. Since no such valid pixel is found in segmented area 103, the processor may determine the segmented area 103 does not need to be processed, or determine the segmented area 103 has been processed. Since there is no other segmented area to be processed, the processor may perform the procedure in block 97.

At block 96, the processor may determine the unprocessed segmented area to be the first segmented area and return to the procedure in block 93.

In an example, the processor may process the segmented area 103 as the first segmented area through procedures in blocks 93 to 94.

At block 97, the processor may output the updated original display data as the reconstructed display data.

In an example, each time a segmented area is processed, the original display data is partially modified. After all of segmented areas have been processed, the final version of the updated original display data may be outputted as the reconstructed display data.

After the above process, the reconstructed display data may have a display effect as shown in FIG. 10B when presented on the text display. As can be seen, the word "Auto" is moved within the display range of the text display, and can be displayed fully.

FIGS. 10A and 10B illustrate an example where plural rows of characters are presented. In situations where plural columns of characters or signs are presented, the processing procedures are similar except that the isolation area found may include plural columns including no valid pixels, thus details are not elaborated herein.

Figure 11:
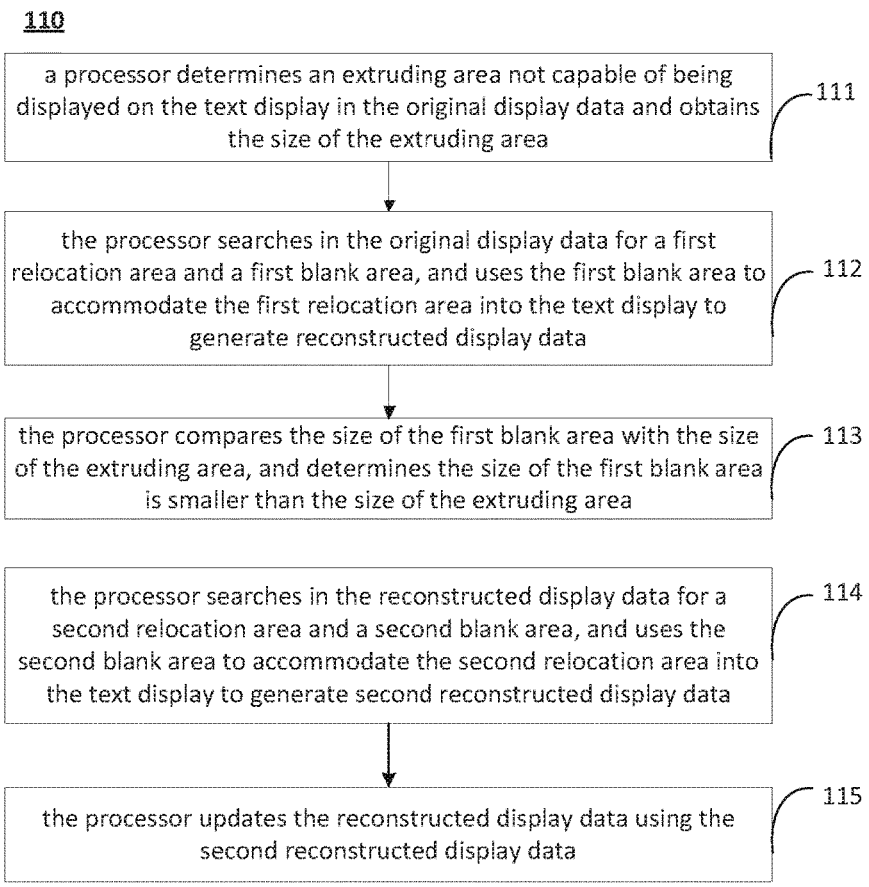
FIG. 11 is a flowchart illustrating a method of generating reconstructed display data using original display data in accordance with an example of the present disclosure.

In an example, a relocation area may be accommodated by plural blank areas. FIG. 11 is a flowchart illustrating a method 110 of processing display data in accordance with an example of the present disclosure. The method 110 may include the following procedures.

At block 111, a processor may determine an extruding area not capable of being displayed on the text display in the original display data and obtaining the size of the extruding area.

In an example, the extruding area may be found according to the method 40, method 50, or method 70.

At block 112, the processor may search in the original display data for a first relocation area and a first blank area, and use the first blank area to accommodate the first relocation area into the text display to generate reconstructed display data.

In an example, the first relocation area may be found according to the above methods. In an example, the first blank area may be multiple continuous lines including no valid pixels and capable of being displayed on the text display. The processor may determine such continuous lines to be the first blank area as long as the number of the continuous lines is larger than a pre-determined threshold. The pre-defined threshold may be determined according to the size of an interval between two characters or two words.

Figure 12A:
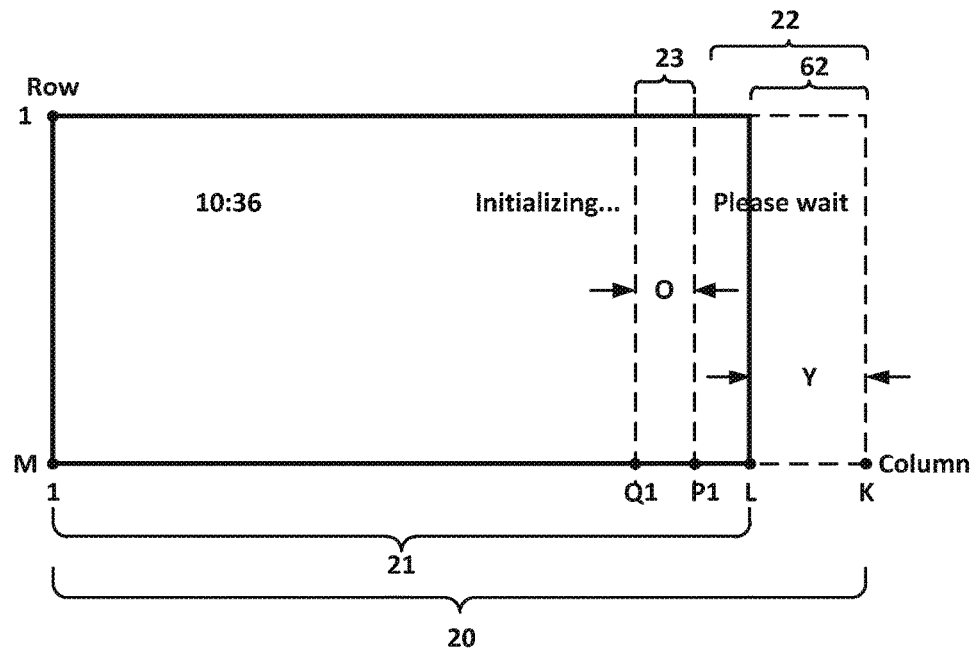
FIG. 12A is a schematic diagram illustrating the effect presenting original display data on a text display having a resolution not matching that of the original display data in accordance with an example of the present disclosure.

In an example, referring to FIG. 12A, the sentence "Please wait" is partially out of the text display area 21, thus cannot be displayed in complete on the text display. The extruding area 62 may be from column L+1 to column K, and has a size of Y which is the difference between K and L. The first relocation area 22 may be from column K to column P1+1. The processor may search from column P1 towards column 1 for continuous columns including no valid pixels, and determine the first blank area 23 is from column Q1+1 to column P1. The size of the first blank area 23 is the difference between P1 and Q1, denoted as O.

In an example, when determining the first blank area, the process may subtract a pre-determined number of continuous lines from the continuous lines including no valid pixels, so as to provide an interval between two groups of characters or signs. In an example, referring to FIG. 12A, a pre-determined number of continuous columns including no valid pixels may be included in to the first relocation area 22, serving as an interval between the sentence "Please wait" and the sentence "Initializing . . . ". In an example, the pre-determined number of continuous columns including no valid pixels may be left out on the side of the sentence "Initializing . . . ".

Figure 12B:
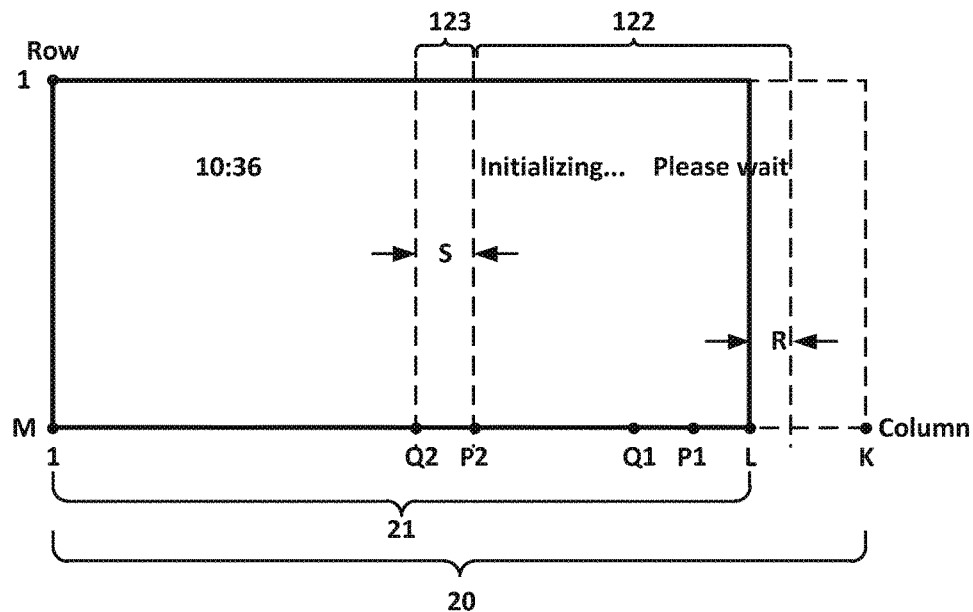
FIG. 12B is a schematic diagram illustrating the effect of presenting first reconstructed display data obtained from the original display data using a first blank area on a text display in accordance with an example of the present disclosure.

In an example, referring to FIG. 12B, after the first relocation area is moved to the position of the first blank area, the word "Please" is moved within the text display area 21, and most of the word "wait" is still out of the text display area 21.

At block 113, the processor may compare the size of the first blank area with the size of the extruding area, and determine the size of the first blank area is smaller than the size of the extruding area.

At block 114, the processor may search in the reconstructed display data for a second relocation area including valid pixels not capable of being displayed on the text display and a second blank area not including valid pixels and capable of being displayed on the text display, and use the second blank area to accommodate the second relocation area within the text display to generate second reconstructed display data.

In an example, as shown in FIG. 12B, since the size of the first blank area O is smaller than the size of the extruding area Y, the processor may search in the reconstructed display data for a second relocation area and a second blank area. The difference between Y and O may be R. When searching for the second blank area, the processor may try to find a blank area having a size equal to R. If the second blank area found is large enough, the second relocation area may be moved by R lines to be within the text display. If the second blank area found has a size smaller than R, the processor may search for a third relocation area and a third blank area after moving the second relocation area to the position of the second blank area.

Figure 2B:
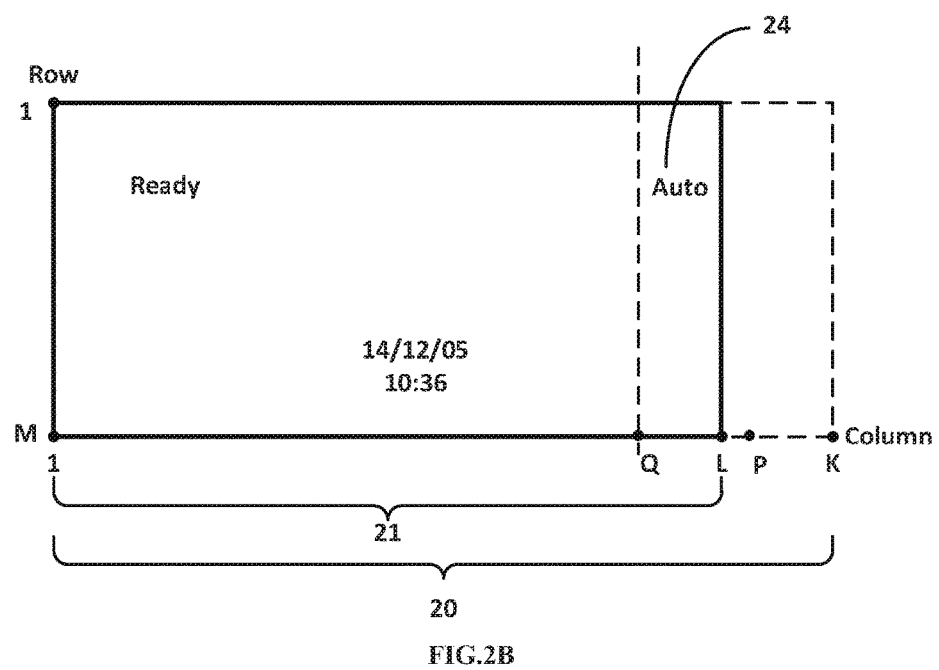
FIG. 2B is a schematic diagram illustrating the effect of presenting reconstructed display data obtained from original display data on a text display in accordance with an example of the present disclosure.
Figure 12C:
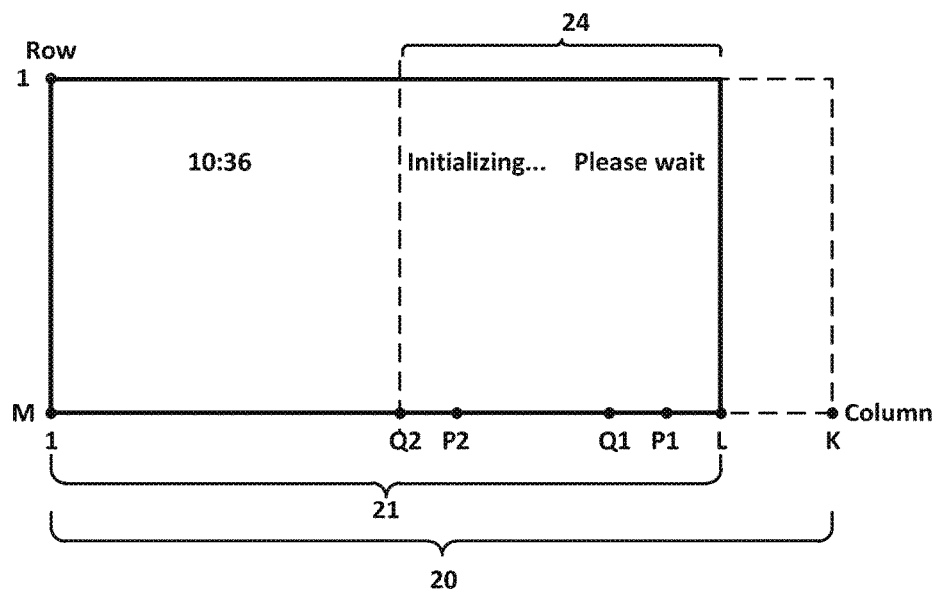
FIG. 12C is a schematic diagram illustrating the effect of presenting second reconstructed display data obtained from the first reconstructed display data using a second blank area on a text display in accordance with an example of the present disclosure.

In an example, referring to FIG. 2B, the second relocation area 122 may be from column P2+1 to column L+R, and the second blank area 123 may be from column Q2+1 to column P2. The size of the second blank area 123, i.e., the difference between P2 and Q2, is S, which is equal to R. The processor may move the second relocation area 122 to the position of the second blank area, and generate the second reconstructed display data. The second reconstructed display data may have a display effect as shown in FIG. 12C. Referring to FIG. 12C, the sentences "Please wait" and "Initializing . . . " are displayed in area 24 within the text display area 21, thus can be displayed in complete on the text display.

At block 115, the processor may update the reconstructed display data using the second reconstructed display data.

After the above processing, the processor may take the second reconstructed display data as the reconstructed data. In an example, the processor may output the updated reconstructed display data to the text display for display. In an example, the processor may continue to process an unprocessed segmented area if the method 110 is applied to one of segmented areas in the original display data.

In an example, the processor may repeat the procedure in block 114 if the second blank area is not large enough to accommodate the second relocation area within the text display. In an example, the processor may judge whether the size of the second blank area is smaller than the difference in size between the extruding area and the first blank area. In an example, referring to FIG. 12B, the processor may judge whether S is smaller than R, and repeat the procedure in block 114 if S is smaller than R.

Figure 13:
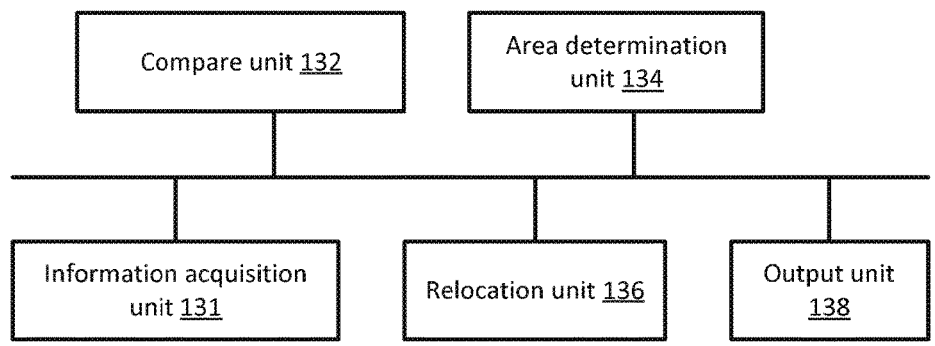
FIG. 13 is a schematic diagram illustrating the structure of an apparatus for processing display data in accordance with an example of the present disclosure.

According to various examples of the present disclosure, the method of various examples may be implemented by a display controller 130 for presenting display data on a text display, such as the display controller 130 described with reference to FIG. 13. A controller may refer to a dedicated circuitry or logic that is permanently configured (e.g., as a special-purpose processor, such as a field programmable gate array (FPGA), an application-specific integrated circuit (ASIC)), or a general-purpose processor or other programmable processor capable of executing machine-readable instructions. In an example, the display controller 130 may be a component of a machine having a text display, e.g., a circuitry in a controller of the machine that functions to perform the method of presenting display data on a text display. In an example, the display controller 130 may be an external device accessible by the machine. As shown in FIG. 13, the display controller 130 may include the following components.

An information acquisition unit 131 is to receive original display data with a first resolution, and obtain a second resolution of the text display.

A compare unit 132 is to compare the first resolution with the second resolution, make a determination that the second resolution is smaller than the first resolution, and instruct the area determination unit to determine a relocation area and a blank area.

An area determination unit 134 is to search in the original display data for a valid pixel not capable of being displayed on the text display, determine in the original display data a relocation area which includes the valid pixel found and search in the original display data for a blank area capable of being displayed on the text display and not including valid pixels. In an example, the relocation area includes valid pixels not capable of being displayed on the text display, and the blank area does not include valid pixels and is capable of being displayed on the text display.

A relocation unit 136 is to move the relocation area to a position of the blank area to generate reconstructed display data.

An output unit 138 is to output the reconstructed display data to the text display.

In an example, the area determination unit 134 may determine an extruding area, and search for the blank area according to the extruding area. In example, the area determination unit 134 may perform a process in connection with the above described method 40, method 50 or method 70 to determine the extruding area and find the blank area.

In an example, the area determination unit 134 may partition the original display data into segments and process each segmented area independently. In an example, the area determination unit 134 may search in the original display data for an isolation area, divide the original display data into plural segmented areas according to the isolation area, search in a first segmented area of the plural segmented areas for the relocation area, search in the first segmented area for the blank area, and instruct the relocation unit 136 to move the relocation area to the position of the blank area. The original display data may have M rows and K columns of pixels, and the isolation area may include no valid pixels from column 1 to column K, or the isolation area may include no valid pixels from row 1 to row M. For example, the area determination unit 134 may carry out a process described in connection with method 90.

In an example, the area determination unit 134 may use plural blank areas to accommodate the relocation area. In an example, after the relocation unit uses a first blank area to accommodate a first relocation area, the area determination unit 134 may search in reconstructed display data for a second relocation area and a second blank area if the first blank area is smaller than the extruding area. For example, the area determination unit 134 may follow a process similar to that of method 110 to obtain the reconstructed display data.

Figure 14:
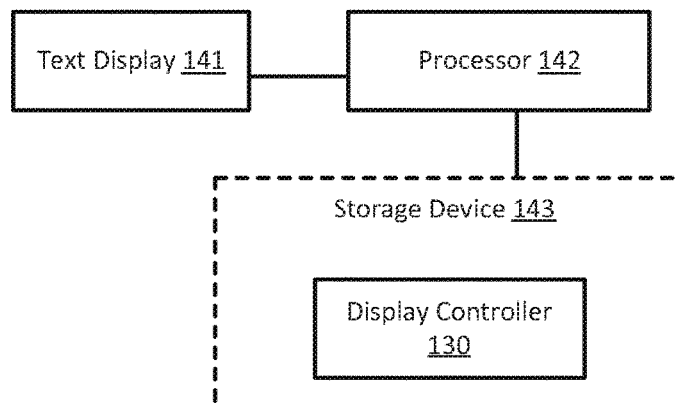
FIG. 14 is a schematic diagram illustrating the structure of a machine in accordance with an example of the present disclosure.

According to various examples, a machine 140 may be capable of executing the method of examples. As shown in FIG. 14, the machine 140 may include a text display 141, a processor 142 and a storage device 143. In an example, the display controller 130 may include machine-readable instructions stored in the storage device 143. The processor 143 may be capable of executing the machine-readable instructions stored in the storage device 143 for presenting display data on the text display.

In an example, the processor 142 may be a dedicated circuitry or logic that is permanently configured (e.g., as a special-purpose processor, such as a field programmable gate array (FPGA), an application-specific integrated circuit (ASIC)). In an example, the processor 142 may also include a general-purpose processor or other programmable processor capable of executing machine-readable instructions.

The storage device 143 may be a non-transitory machine-readable medium. In an example, the storage device 143 may include a read-only memory (ROM), a random-access memory (RAM), a flash memory of a processor within the machine, a portable storage device, an external storage device accessible by the machine via a wired or wireless network, or the like.

In various examples, the processor 142 may execute the instructions to carry out the method of various examples.

In an example, the processor 142 may receive original display data with a first resolution, obtain a second resolution of the text display, search in the original display data for a valid pixel not capable of being displayed on the text display when the second resolution is smaller than the first resolution, determine in the original display data a relocation area which includes valid pixels to be relocated together with the valid pixel found and search in the original display data for a blank area, move the relocation area within the text display by use of the blank area to generate reconstructed display data, and output the reconstructed display data to the text display.

In an example, the processor 142 may determine an extruding area in the relocation area and obtain a size of the extruding area, and search for the blank area having a size equal to the size of the extruding area.

In an example, the processor 142 may search in the original display data for an isolation area, divide the original display data into plural segmented areas according to the isolation area, and search in a first segmented area of the plural segmented areas for the relocation area and the blank area.

Figure 15:
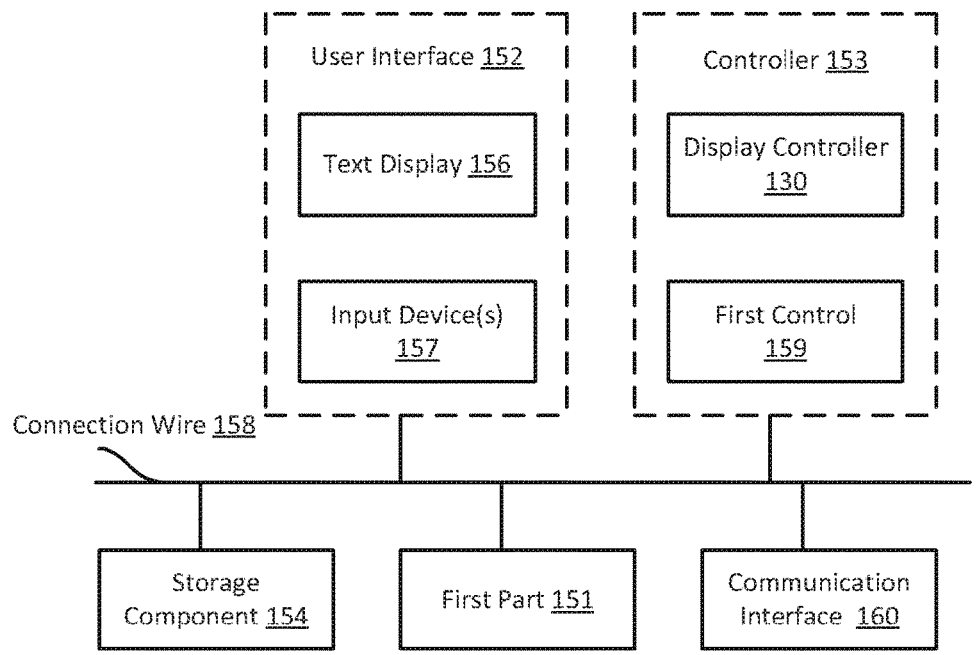
FIG. 15 is a schematic diagram illustrating the structure of a machine in accordance with an example of the present disclosure.

In an example, referring to FIG. 15, the method of various examples may be applied to a machine 150. The machine 150 may include a main part 151, a controller 153 for controlling the main part 151, a user interface 152, a storage component 154 for storing various data used or generated by the controller 153 and the main part 151, a communication interface 160 for connecting the machine 150 with an external device via wired or wireless links, and a connection wire 158 for connecting various components of the machine 150.

The first part 151 may be a component for fulfilling the purpose of the machine 150. In an example, the first part 151 may be printing components in a printer, a temperature measuring component in a thermometer, or the like.

The user interface 152 may be a component for monitoring and control purposes. The user interface 152 may provide a text display 156 for displaying the state of the machine, e.g., a working state of the first part 151, a measurement result obtained by the first part 151, an alert, or the like. In an example, the user interface 152 may also provide input devices 157 for receiving user control signals, such as buttons, knobs, touch screens, or the like.

The controller 153 may control the running of the first part 151 and the text display 156. In an example, the controller 153 may include a display controller 130 and a first control 159 which controls the first part 151. In an example, the first control 159 may monitor the working state of the first part 151, generate display data and provide the display data to the display controller 130 for display on the text display 156.

For example, the machine 150 may be a printer. The first control 159 may obtain the working state of the printing components (i.e., the first part 151). The working state may include initializing, ready to print, receiving document, printing document "XXX", paper jam, or the like. The first control 159 may select one of pre-defined display data or generate display data, and provide the display data to the display controller 130. In an example, the pre-defined display data may be stored in the storage component 154 or in the controller 153. The display controller 130 may receive the display data as original display data, and carry out the method of various examples to adapt the original display data to the text display 156. In an example, the display controller 130 may obtain hardware information of the text display 156 from a storage medium in the text display 156, and obtain the resolution of the text display 156 from the hardware information.

In various examples, the controller 153 may include one or plural processors. In an example, the processor may be a dedicated circuitry or logic that is permanently configured (e.g., as a special-purpose processor, such as a field programmable gate array (FPGA), an application-specific integrated circuit (ASIC)). In an example, the processor may also include a general-purpose processor or other programmable processor capable of executing machine-readable instructions.

According to various examples, original display data of a first resolution may be adapted to a text display having a second resolution smaller than the first resolution, thus omission of the content of the original display data can be avoided.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the present disclosure and its practical applications, to thereby enable others skilled in the art to best utilize the present disclosure and various examples with various modifications as are suited to the particular use contemplated. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A method comprising:
   in response to a determination that a number of lines of original display data is greater than a number of lines of a text display on which the original display data is to be displayed, locating in the original display data a first relocation area including valid pixels not capable of being displayed on the text display, a first display data part of the original display data forming the first relocation area;
   locating in the original display data a first blank area between the first display data part and a second display data part;
   accommodating the first relocation area within the first blank area to generate first reconstructed display data in which the first relocation area overlaps the first blank area;
   in response to a determination that a number of lines of the first reconstructed data is greater than the number of lines of the text display, locating in the original display data a second relocation area including a subset of the valid pixels of the first relocation area, the first display data part and the second display data part forming the second relocation area;
   locating in the first reconstructed display data a second blank area between the second display data part and a third display data part;
   accommodating the second relocation area within the second blank to generate second reconstructed display data in which the second relocation area overlaps the second blank area; and
   outputting the second reconstructed display data to the text display.

2. The method of claim 1, wherein locating in the original display data for the first blank area comprises:
   determining an extruding area not capable of being displayed on the text display in the original display data, and obtaining a size of the extruding area; and searching for the first blank area having a size equal to the size of the extruding area.

3. The method of claim 2, wherein determining the extruding area in the first relocation area comprises:

determining an area from row N+1 to row A of the original display data to be the extruding area if there is a valid pixel in row A and there is no valid pixels from row A+1 to row M, wherein M is the number of rows of the original display data, and N is the number of rows of the text display, and A is larger than N; and searching for the first blank area having the size equal to the size of the extruding area comprises: searching between row 1 and row N for the first blank area having X rows, wherein X equals to a difference of A and N.

4. The method of claim 2, wherein determining the extruding area in the first relocation area comprises:

determining an area from column L+1 to column B of the original display data to be the extruding area if there is a valid pixel in column B and there is no valid pixels from column B+1 to column K, wherein K is the number of columns of the original display data, and L is the number of columns of the text display, and B is larger than L; and searching for the first blank area having the size equal to the size of the extruding area comprises: searching between column 1 and column L for the first blank area having Y columns, wherein Y equals to a difference of B and L.

5. The method of claim 1, further comprising:

searching in the original display data for an isolation area, wherein the original display data has M rows and K columns of pixels, and the isolation area includes no valid pixels from column 1 to column K, or the isolation area includes no valid pixels from row 1 to row M; and dividing the original display data into plural segmented areas according to the isolation area; and searching in the original display data for the first relocation area and searching in the original display data for the first blank area comprise: searching in a first segmented area of the plural segmented areas for the first relocation area, and searching in the first segmented area for the first blank area.

6. A non-transitory computer-readable storage medium, comprising: instructions to present display data on a text display, wherein the instructions are executable by a processor to:

in response to a determination that a number of lines of original display data is greater than a number of lines of a text display on which the original display data is to be displayed, locate in the original display data a first relocation area including valid pixels not capable of being displayed on the text display, a first display data part of the original display data forming the first relocation area;

locate in the original display data a first blank area between the first display data part and a second display data part;

accommodate the first relocation area within the first blank area to generate first reconstructed display data in which the first relocation area overlaps the first blank area;

in response to a determination that a number of lines of the first reconstructed data is greater than the number of lines of the text display, locate in the original display data a second relocation area including a subset of the valid pixels of the first relocation area, the first display data part and the second display data part forming the second relocation area;

locate in the first reconstructed display data a second blank area between the second display data part and a third display data part;

accommodate the second relocation area within the second blank to generate second reconstructed display data in which the second relocation area overlaps the second blank area; and output the second reconstructed display data to the text display.

7. The non-transitory computer-readable medium of claim 6, wherein the instructions are executable by a processor to:

determine an extruding area not capable of being displayed on the text display in the original display data, and obtain a size of the extruding area;

search for the first blank area having a size equal to the size of the extruding area.

8. The non-transitory computer-readable medium of claim 7, wherein the instructions are executable by a processor to:

determine an area from row N+1 to row A of the original display data to be the extruding area if there is a valid pixel in row A and there is no valid pixels from row A+1 to row M, wherein M is the number of rows of the original display data, and N is the number of rows of the text display, and A is larger than N; and search between row 1 and row N for the first blank area having X rows, wherein X equals to a different of A and N.

9. The non-transitory computer-readable medium of claim 7, wherein the instructions are executable by a processor to:

determine an area from column L+1 to column B of the original display data to be the extruding area if there is a valid pixel in column B and there is no valid pixels from column B+1 to column K, wherein K is the number of columns of the original display data, and L is the number of columns of the text display, and B is larger than L; and search between column 1 and column L for the first blank area having Y columns, wherein Y equals to a difference of B and L.

10. The non-transitory computer-readable medium of claim 6, wherein the instructions are executable by a processor to:

search in the original display data for an isolation area, wherein the original display data has M rows and K columns of pixels, and the isolation area includes no valid pixels from column 1 to column K, or the isolation area includes no valid pixels from row 1 to row M;

divide the original display data into plural segmented areas according to the isolation area; and search in a first segmented area of the plural segmented areas for the first relocation area, and search in the first segmented area for the first blank area.

11. A machine, comprising:

a text display, and a processor capable of executing instructions stored in a non-transitory computer-readable medium for presenting display data on the text display;

wherein the instructions are to:

in response to a determination that a number of lines of original display data is greater than a number of lines of a text display on which the original display data is to be displayed, locate in the original display data a first relocation area including valid pixels not capable of being displayed on the text display, a first display data part of the original display data forming the first relocation area;

locate in the original display data a first blank area between the first display data part and a second display data part;

accommodate the first relocation area within the first blank area to generate first reconstructed display data in which the first location area overlaps the first blank area;

in response to a determination that a number of lines of the first reconstructed data is greater than the number of lines of the text display, locate in the original display data a second relocation area including a subset of the valid pixels of the first relocation area, the first display data part and the second display data part forming the second relocation area;

locate in the first reconstructed display data a second blank area between the second display data part and a third display data part;

accommodate the second relocation area within the second blank to generate second reconstructed display data in which the second relocation area overlaps the second blank area; and output the second reconstructed display data to the text display.

12. The machine of claim 11, wherein the processor is capable of executing the instructions to:

determine an extruding area not capable of being displayed on the text display in the original display data and obtain a size of the extruding area; and search for the first blank area having a size equal to the size of the extruding area.

13. The machine of claim 11, wherein the processor is capable of executing the instructions to:

search in the original display data for an isolation area, wherein the original display data has M rows and K columns of pixels, and the isolation area includes no valid pixels from column 1 to column K, or the isolation area includes no valid pixels from row 1 to row M;

divide the original display data into plural segmented areas according to the isolation area; and search in a first segmented area of the plural segmented areas for the first relocation area, and search in the first segmented area for the first blank area.

* * * * *

UNITED STATES PATENT AND TRADEMARK OFFICE
CERTIFICATE OF CORRECTION

PATENT NO. : 10,438,567 B2
APPLICATION NO. : 15/570943
DATED : October 8, 2019
INVENTOR(S) : Xiaorong Chai et al.

Page 1 of 1

It is certified that error appears in the above-identified patent and that said Letters Patent is hereby corrected as shown below:

In the Claims

In Column 18, Line 29, Claim 8, delete "different" and insert -- difference --, therefor.

Signed and Sealed this
Seventeenth Day of March, 2020

Andrei Iancu
*Director of the United States Patent and Trademark Office*